US012742400B2

(12) United States Patent
Fryer

(10) Patent No.: US 12,742,400 B2
(45) Date of Patent: Sep. 22, 2026

(54) JOINT ARRANGEMENT FOR IMPELLER CONTAINMENT

(71) Applicant: Pratt & Whitney Canada Corp., Longueuil (CA)

(72) Inventor: Michael Fryer, Oakville (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 18/821,054

(22) Filed: Aug. 30, 2024

(65) Prior Publication Data

US 2026/0063055 A1 Mar. 5, 2026

(51) Int. Cl.

| | |
|---|---|
| ***F01D 25/00*** | (2006.01) |
| ***F01D 9/02*** | (2006.01) |
| ***F01D 25/16*** | (2006.01) |
| ***F01D 25/24*** | (2006.01) |
| ***F01D 25/28*** | (2006.01) |

(52) U.S. Cl.

CPC ............. *F01D 25/28* (2013.01); *F01D 9/026* (2013.01); *F01D 25/162* (2013.01); *F01D 25/243* (2013.01); *F05D 2240/24* (2013.01); *F05D 2240/35* (2013.01)

(58) Field of Classification Search

None

See application file for complete search history.

(56) References Cited

U.S. PATENT DOCUMENTS

| | | | | |
|---|---|---|---|---|
| 2,042,550 A * | 6/1936 | Puffer | F04D 25/02 123/559.1 |
| 2,972,230 A * | 2/1961 | Conklin | F02C 3/103 60/797 |
| 4,446,696 A * | 5/1984 | Sargisson | F02K 3/077 60/226.3 |
| 6,464,454 B1 * | 10/2002 | Kotkaniemi | F04D 7/045 415/196 |
| 6,854,956 B2 | 2/2005 | Miwata et al. | |
| 7,037,069 B2 * | 5/2006 | Arnold | F04D 7/045 415/128 |
| 7,874,136 B2 | 1/2011 | Heyerman | |
| 8,182,216 B2 | 5/2012 | Lhoest | |
| 9,777,592 B2 | 10/2017 | Denis et al. | |
| 9,879,594 B2 | 1/2018 | Annati et al. | |
| 10,190,439 B2 | 1/2019 | Korshikov et al. | |
| 12,385,414 B1 | 8/2025 | Lefebvre et al. | |

(Continued)

OTHER PUBLICATIONS

Extended European Search Report for EP Application No. 25196860.8, dated Feb. 2, 2026, pp. 1-8.

*Primary Examiner* — Edwin Kang
(74) *Attorney, Agent, or Firm* — CANTOR COLBURN LLP

(57) ABSTRACT

A compressor assembly of a gas turbine engine of an aircraft includes an impeller configured to rotate about an engine central longitudinal axis, and a diffuser positioned at a compressor outlet fluidly downstream of the impeller. One or more support structures are secured to the diffuser via a plurality of support fasteners. The plurality of support fasteners are configured to be frangible when torsional loads from the diffuser on the one or more support structures exceed a predetermined limit, thereby isolating the impeller and the diffuser from the one or more support structures.

14 Claims, 4 Drawing Sheets

(56) References Cited

U.S. PATENT DOCUMENTS

| | | | | |
|---|---|---|---|---|
| 2006/0120197 | A1* | 6/2006 | Teolis | F02C 9/28 365/226 |
| 2006/0122798 | A1* | 6/2006 | Teolis | G01M 15/14 702/66 |
| 2011/0094100 | A1 | 4/2011 | Heyerman | |
| 2015/0104297 | A1 | 4/2015 | Pinkney et al. | |
| 2015/0275694 | A1* | 10/2015 | Reinhardt | F01D 25/162 29/889.22 |
| 2018/0216633 | A1* | 8/2018 | Makino | F04D 29/441 |
| 2021/0040856 | A1* | 2/2021 | Dyson | B23P 15/04 |
| 2021/0156272 | A1* | 5/2021 | Yam | F01D 9/042 |
| 2021/0281004 | A1* | 9/2021 | Trawick | H01R 13/052 |

* cited by examiner

JOINT ARRANGEMENT FOR IMPELLER CONTAINMENT

BACKGROUND

Exemplary embodiments pertain to the art of gas turbine engines, and in particular those utilizing impeller compressors. Such gas turbine engines are often utilized in turbo-prop configurations to drive propeller assemblies of aircraft, and also utilized in other configurations such as turbo-jets, turbo-fans, and turbo-shafts.

Flight-based turbo machinery with such mixed flow compressor impellers present a complex challenge where containment structures are required to manage high energy fragments released in the event of a damaged or failed impeller. In such incidents, a high energy release is from a tri-hub failure where the impeller separates into three uniform segments.

In such flight-based machines the containment structure includes several elements that are strategically positioned around the impeller to absorb or dissipate the impeller's kinetic energy both radially and torsionally. The elements thus prevent loads from the compressor from being transferred to the supporting structure, which may result in damage thereto.

BRIEF DESCRIPTION

In one exemplary embodiment, a compressor assembly of a gas turbine engine of an aircraft includes an impeller configured to rotate about an engine central longitudinal axis, and a diffuser positioned at a compressor outlet fluidly downstream of the impeller. One or more support structures are secured to the diffuser via a plurality of support fasteners. The plurality of support fasteners are configured to be frangible when torsional loads from the diffuser on the one or more support structures exceed a predetermined limit, thereby isolating the impeller and the diffuser from the one or more support structures.

Additionally or alternatively, in this or other embodiments a first support structure of the one or more support structures is a compressor scroll positioned radially outboard of the diffuser.

Additionally or alternatively, in this or other embodiments a containment flange is secured to the compressor scroll via a plurality of scroll flange bolts and is secured to the diffuser via a plurality of diffuser flange bolts. The plurality of diffuser flange bolts are support fasteners.

Additionally or alternatively, in this or other embodiments the containment flange extends radially across a scroll flange of the compressor scroll and a diffuser flange of the diffuser.

Additionally or alternatively, in this or other embodiments a plurality of anti-shear pins are positioned between circumferentially adjacent scroll flange bolts of the plurality of scroll flange bolts. The plurality of anti-shear pins extend through the containment flange and at least partially into the compressor scroll.

Additionally or alternatively, in this or other embodiments the plurality of scroll flange bolts have a first bolt diameter larger than a second bolt diameter of the plurality of diffuser flange bolts.

Additionally or alternatively, in this or other embodiments a second support structure of the one or more support structures is a bearing support structure of the gas turbine engine.

In another exemplary embodiment, a gas turbine engine of an aircraft includes a combustor, a turbine driven about an engine central longitudinal axis by a flow of combustion products from the combustor, and a compressor assembly. The compressor assembly includes an impeller configured to rotate about the engine central longitudinal axis by rotation of the turbine, and a diffuser positioned at a compressor outlet fluidly downstream of the impeller. One or more support structures are secured to the diffuser via a plurality of support fasteners. The plurality of support fasteners are configured to be frangible when torsional loads from the diffuser on the one or more support structures exceed a predetermined limit, thereby isolating the impeller and the diffuser from the one or more support structures.

Additionally or alternatively, in this or other embodiments a first support structure of the one or more support structures is a compressor scroll located radially outboard of the diffuser.

Additionally or alternatively, in this or other embodiments a containment flange is secured to the compressor scroll via a plurality of scroll flange bolts and is secured to the diffuser via a plurality of diffuser flange bolts, wherein the plurality of diffuser flange bolts are support fasteners.

Additionally or alternatively, in this or other embodiments the containment flange extends radially across a scroll flange of the compressor scroll and a diffuser flange of the diffuser.

Additionally or alternatively, in this or other embodiments a plurality of anti-shear pins are positioned between circumferentially adjacent scroll flange bolts of the plurality of scroll flange bolts. The plurality of anti-shear pins extend through the containment flange and at least partially into the compressor scroll.

Additionally or alternatively, in this or other embodiments the plurality of scroll flange bolts have a first bolt diameter larger than a second bolt diameter of the plurality of diffuser flange bolts.

Additionally or alternatively, in this or other embodiments a second support structure of the one or more support structures is a bearing support structure of the gas turbine engine.

In yet another exemplary embodiment, a propeller and engine system of an aircraft includes a propeller assembly including a hub, and a plurality of propeller blades operably connected to the hub. A gas turbine engine is operably connected to the propeller assembly and is configured to drive the propeller assembly. The gas turbine engine includes a compressor assembly including an impeller configured to rotate about an engine central longitudinal axis, and a diffuser positioned at a compressor outlet fluidly downstream of the impeller. One or more support structures are secured to the diffuser via a plurality of support fasteners. The plurality of support fasteners are configured to be frangible when torsional loads from the diffuser on the one or more support structures exceed a predetermined limit, thereby isolating the impeller and the diffuser from the one or more support structures.

Additionally or alternatively, in this or other embodiments a first support structure of the one or more support structures is a compressor scroll positioned radially outboard of the diffuser.

Additionally or alternatively, in this or other embodiments a containment flange is secured to the compressor scroll via a plurality of scroll flange bolts and is secured to the diffuser via a plurality of diffuser flange bolts. The plurality of diffuser flange bolts are support fasteners.

Additionally or alternatively, in this or other embodiments the containment flange extends radially across a scroll flange of the compressor scroll and a diffuser flange of the diffuser.

Additionally or alternatively, in this or other embodiments a plurality of anti-shear pins are positioned between circumferentially adjacent scroll flange bolts of the plurality of scroll flange bolts. The plurality of anti-shear pins extend through the containment flange and at least partially into the compressor scroll.

Additionally or alternatively, in this or other embodiments a second support structure of the one or more support structures is a bearing support structure of the gas turbine engine.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
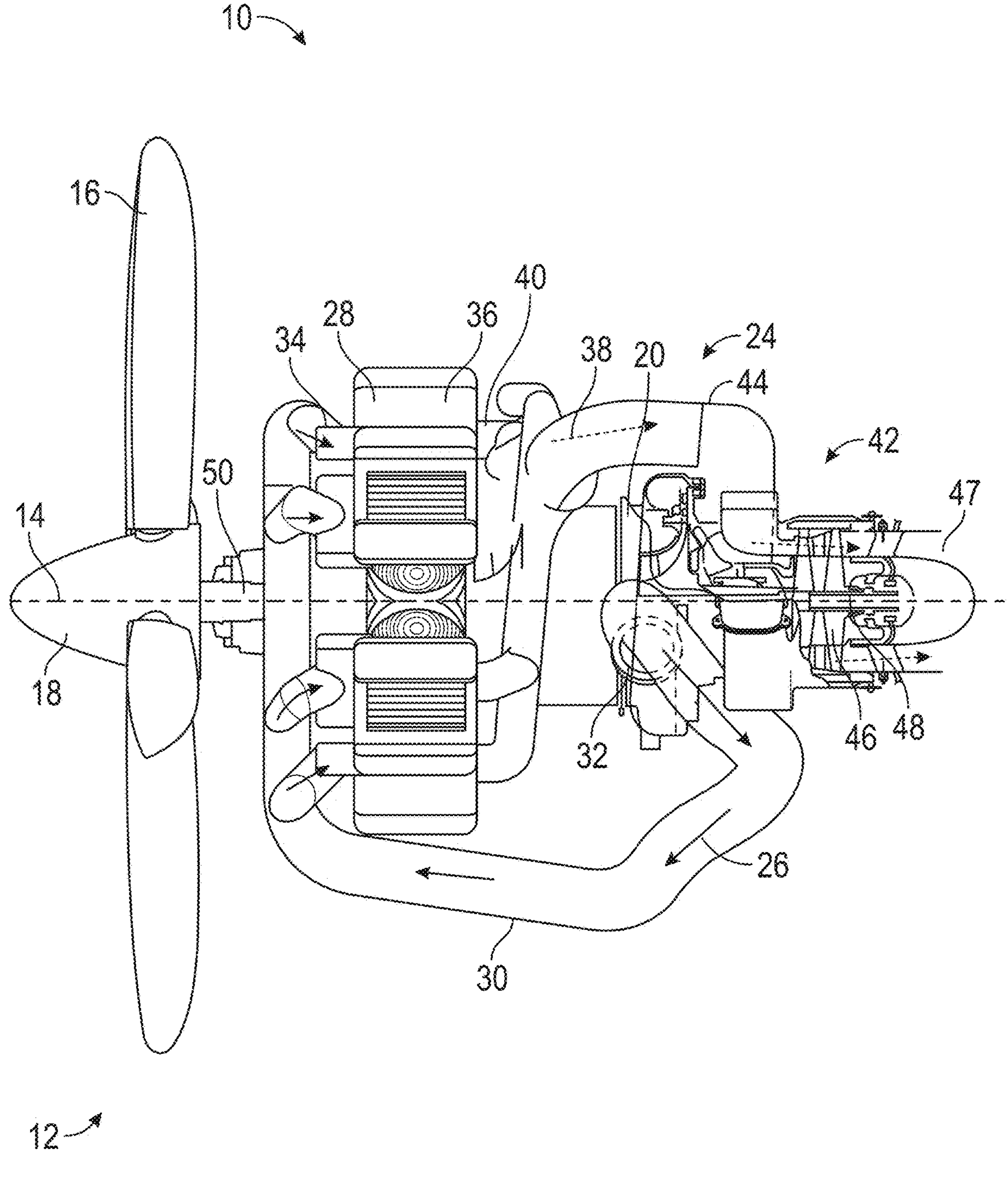
FIG. 1 is a cross-sectional view of an embodiment of a gas turbine engine and propeller system of an aircraft.

FIG. 1 illustrates a gas turbine engine 10, which drives a propeller 12 of an aircraft. The gas turbine engine 10 and the propeller 12 are arranged along a common central longitudinal axis 14. The propeller 12 includes a plurality of propeller blades 16 extending from a propeller hub 18.

The gas turbine engine 10 includes one or more inlets 20 through which an airflow is directed into a compressor section 24. The compressed airflow 26 is directed to a combustor 28, or alternatively another prime mover system, where the compressed airflow 26 is mixed with fuel and combusted. In some embodiments, the combustor 28 is located axially forward of the compressor section 24, between the compressor section 24 and the propeller 12. In some embodiments, the compressed airflow 26 is directed to the combustor 28 via a compressor outlet duct 30 extending from a compressor outlet 32 to a combustor inlet 34. Additionally, in some embodiments the combustor inlet 34 is located at an axially-forward end of the combustor 28, between a combustor body 36 and the propeller 12.

Combustion products 38 exit the combustor 28 at a combustor outlet 40, which in some embodiments is at an axially-aft end of the combustor 28. The combustion products 40 are directed to a turbine section 42 via a turbine inlet duct 44 to drive rotation of one or more turbine rotors 46 of the turbine section 42, before being exhausted from the gas turbine engine 10 via an exhaust nozzle 47. The one or more turbine rotors 46 are connected to a turbine shaft 48 which is in turn operably connected to a propeller shaft 50, such that rotation of the turbine rotors 46 about the central longitudinal axis 14 drives rotation of the propeller 12 about the central longitudinal axis 14.

Figure 2:
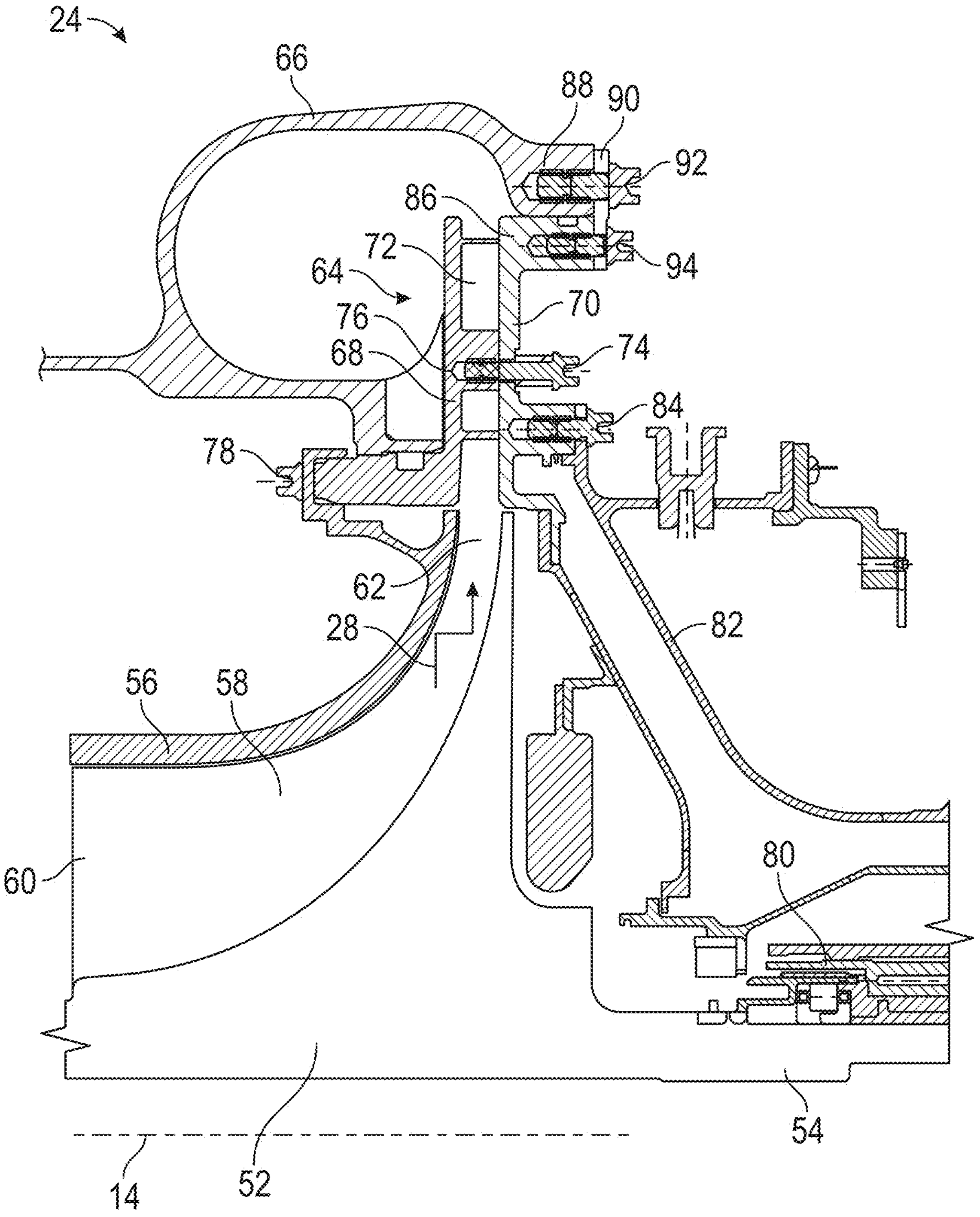
FIG. 2 is a cross-sectional view of an embodiment of a compressor section of a gas turbine engine.

Referring now to FIG. 2, illustrated is an embodiment of a compressor section 24. The compressor section 24 includes a compressor impeller 52 mounted on a compressor shaft 54 at the central longitudinal axis 14. The compressor shaft 54 is operably connected to and driven by the turbine shaft 48 (shown in FIG. 1) such that the compressor impeller 52 and the turbine rotors 46 are directly driven by rotation of the turbine shaft 48 about the central longitudinal axis 14. A compressor case 56 defines a compressor flowpath 58 between a compressor inlet 60 and a compressor outlet 62. A diffuser 64 is located at the compressor outlet 62, and downstream of the diffuser is a compressor scroll 66. In some embodiments, the compressor scroll 66 is located radially outboard of the compressor outlet 62 and the diffuser 64. The compressor scroll 66 directs the compressed airflow 28 out of the compressor section 24 and into the compressor outlet duct 30. The diffuser 64 includes a forward diffuser 68 and a rear diffuser 70 that, when assembled, define the diffuser 64 and a diffuser flowpath 72 therebetween. The forward diffuser 68 is secured to the rear diffuser 70 via a plurality of diffuser bolts 74 extending, for example, through the rear diffuser 70 and at least partially into forward diffuser openings 76 in the forward diffuser 68. In some embodiments, one or more casing bolts 78 are utilized to secure the compressor case 56 and is supported by the forward diffuser 68.

The compressor section 24 further includes a compressor bearing 80 and a compressor bearing support structure 82 supportive of the compressor bearing 80. The compressor bearing support structure 82 is secured to the rear diffuser 70 via a plurality of bearing support bolts 84 extending through the bearing support structure 82 and at least partially into the rear diffuser 70. The rear diffuser 70 is further secured to the compressor scroll 66 at a radially outboard end of the rear diffuser 70. The rear diffuser 70 includes a diffuser flange 86 and the compressor scroll 66 similarly includes a scroll flange 88 that, in some embodiments, radially abuts the diffuser flange 86. A containment flange 90 is located at a radially aft end of scroll flange 88, which also axially abuts a radially aft end of the diffuser flange 86. The scroll flange 88 is secured to the containment flange 90 via a plurality of scroll flange bolts 92 extending through the containment flange 90 and at least partially into the scroll flange 88. Similarly, the diffuser flange 86 is secured to the containment flange 90 via a plurality of diffuser flange bolts 94 extending through the containment flange 90 and into the diffuser flange 86. Thus the rear diffuser 70 is secured to the compressor scroll 66 via the containment flange 90, the scroll flange bolts 92 and the diffuser flange bolts 94.

Figure 3:
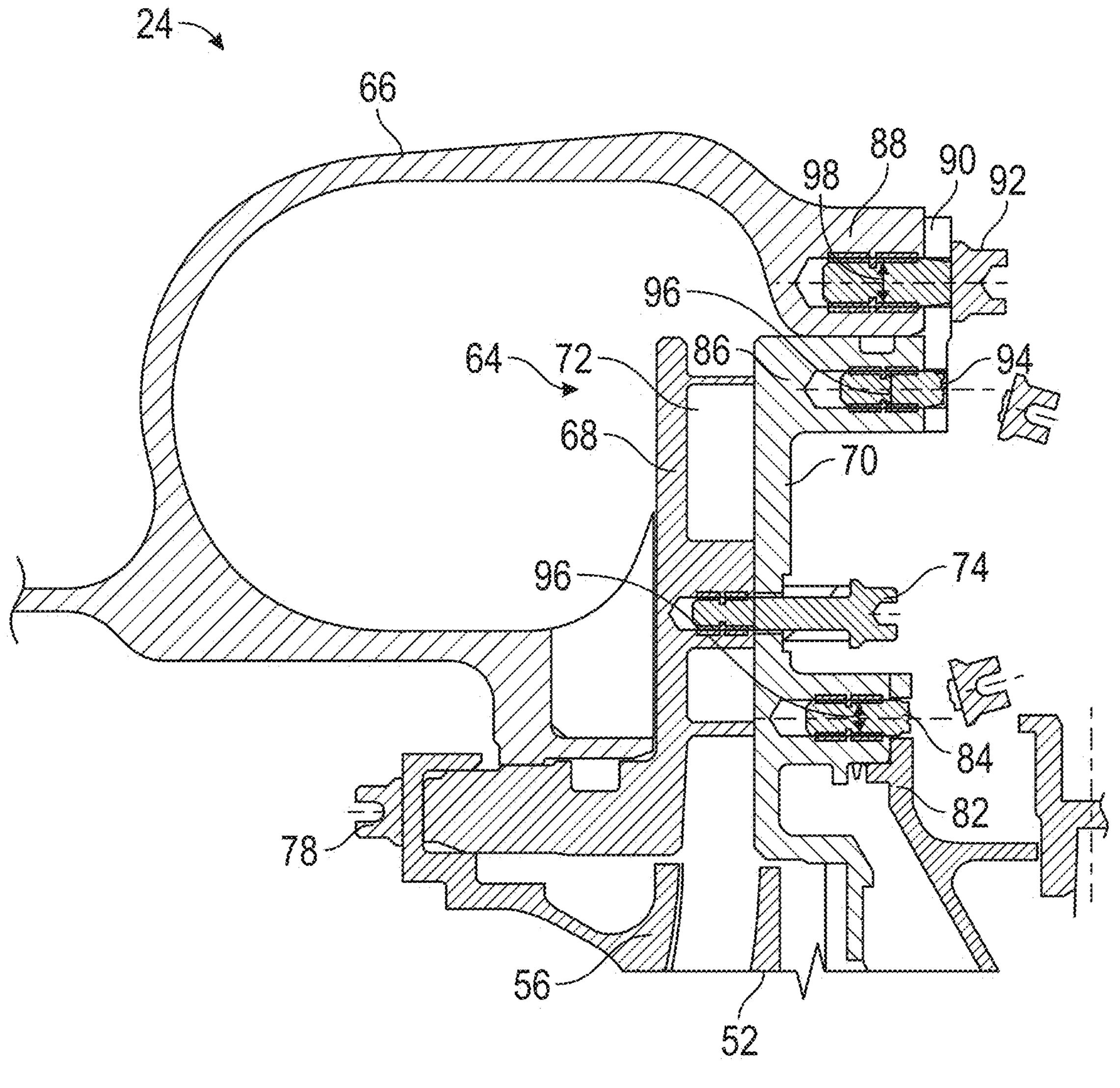
FIG. 3 illustrates an embodiment of an impeller containment system of a compressor section.

Referring now to FIG. 3, the bearing support bolts 84, the diffuser flange bolts 94 and the scroll flange bolts 92 are configured to de-couple the diffuser 64 from the compressor scroll 66 and the bearing support structure 82 in the event of a failure of the compressor impeller 52. To achieve this, the bearing support bolts 84 and the diffuser flange bolts 94 are configured to be frangible under torsional loads at a selected level, such as those at failure of the compressor impeller 52. This prevents torsional loading of the compressor scroll 66 and the bearing support structure 82, to prevent damage thereto. In some embodiments, the bearing support bolts 84 and the diffuser flange bolts 94 have a first bolt diameter 96 less than a second bolt diameter 98 of the scroll flange bolts 92. In some embodiments, the first bolt diameter 96 is in the range of 5% to 50% less than the second bolt diameter 98.

The scroll flange bolts 92 and the diffuser bolts 74 are, however, configured not to fail at the predetermined load, thus retaining the forward diffuser 68 secured to the rear diffuser 70 via the plurality of diffuser bolts 74, and retaining the containment flange 90 to the scroll flange 88 of the compressor scroll 66. The containment flange 90 thus prevents rearward axial displacement of the rear diffuser 70 to contain impeller fragments within the diffuser 54.

Figure 4:
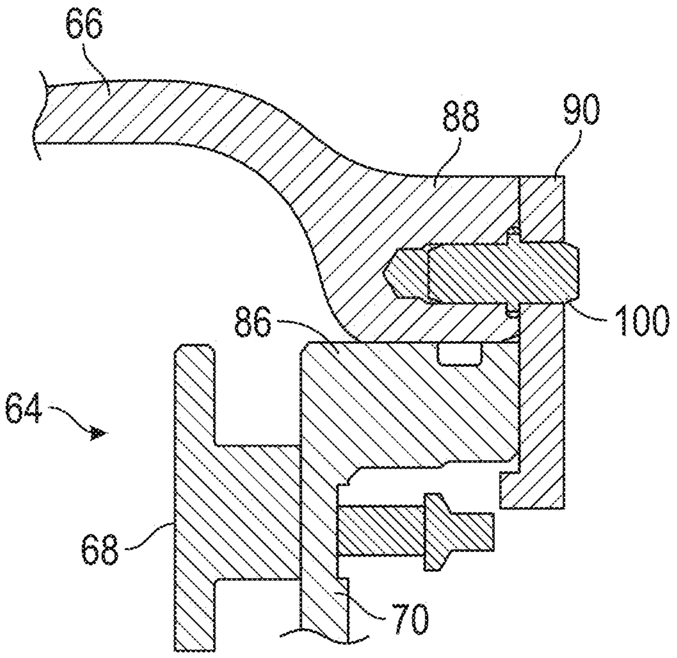
FIG. 4 illustrates an embodiment of a shear pin of an impeller containment system of a compressor section.

Referring to FIG. 4, in some embodiments a plurality of anti-shear pins 100 are installed between circumferentially adjacent scroll flange bolts 92 through the containment flange 90 and into the scroll flange 86. The anti-shear pins 100 are configured to prevent shear loading of the scroll flange bolts 92 in a containment event. The number and size of anti-shear pins 100 may be determined by a predicted shear loading from a system analytical containment analysis.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A compressor assembly of a gas turbine engine of an aircraft, comprising:

an impeller configured to rotate about an engine central longitudinal axis;

a diffuser disposed at a compressor outlet fluidly downstream of the impeller, the diffuser including:

a forward diffuser; and a rear diffuser coupled to the forward diffuser by a plurality of diffuser bolts extending through the rear diffuser and into the forward diffuser; and one or more support structures secured to the diffuser via a plurality of support fasteners;

wherein the plurality of support fasteners are configured to be frangible when torsional loads from the diffuser on the one or more support structures exceed a predetermined limit, thereby isolating the impeller and the diffuser from the one or more support structures;

wherein a first support structure of the one or more support structures is a compressor scroll disposed radially outboard of the diffuser; and further comprising a containment flange secured to the compressor scroll via a plurality of scroll flange bolts and secured to the rear diffuser via a plurality of diffuser flange bolts, wherein the plurality of diffuser flange bolts are support fasteners;

wherein the rear diffuser includes an axially-extending diffuser flange that radially abuts an axially-extending scroll flange of the compressor scroll;

wherein the plurality of diffuser flange bolts extend through the containment flange and at least partially into the axially-extending diffuser flange;

wherein the plurality of scroll flange bolts extend through the containment flange and at least partially into the axially-extending scroll flange; and wherein the axially-extending diffuser flange and the axially-extending scroll flange terminate at a same axial position along the engine central longitudinal axis.

2. The compressor assembly of claim 1, wherein the containment flange extends radially across the axially-extending scroll flange of the compressor scroll and the axially-extending diffuser flange of the diffuser.

3. The compressor assembly of claim 1, further comprising a plurality of anti-shear pins disposed between circumferentially adjacent scroll flange bolts of the plurality of scroll flange bolts, the plurality of anti-shear pins extending through the containment flange and at least partially into the compressor scroll.

4. The compressor assembly of claim 1, wherein the plurality of scroll flange bolts have a first bolt diameter larger than a second bolt diameter of the plurality of diffuser flange bolts.

5. The compressor assembly of claim 1, wherein a second support structure of the one or more support structures is a bearing support structure of the gas turbine engine.

6. A gas turbine engine of an aircraft, comprising:

a combustor;

a turbine driven about an engine central longitudinal axis by a flow of combustion products from the combustor; and a compressor assembly including:

an impeller configured to rotate about the engine central longitudinal axis by rotation of the turbine;

a diffuser disposed at a compressor outlet fluidly downstream of the impeller, the diffuser including:

a forward diffuser; and a rear diffuser coupled to the forward diffuser by a plurality of diffuser bolts extending through the rear diffuser and into the forward diffuser; and one or more support structures secured to the diffuser via a plurality of support fasteners;

wherein the plurality of support fasteners are configured to be frangible when torsional loads from the diffuser on the one or more support structures exceed a predetermined limit, thereby isolating the impeller and the diffuser from the one or more support structures;

wherein a first support structure of the one or more support structures is a compressor scroll disposed radially outboard of the diffuser; and further comprising a containment flange secured to the compressor scroll via a plurality of scroll flange bolts and secured to the rear diffuser via a plurality of diffuser flange bolts, wherein the plurality of diffuser flange bolts are support fasteners;

wherein the rear diffuser includes an axially-extending diffuser flange that radially abuts an axially-extending scroll flange of the compressor scroll;

wherein the plurality of diffuser flange bolts extend through the containment flange and at least partially into the axially-extending diffuser flange;

wherein the plurality of scroll flange bolts extend through the containment flange and at least partially into the axially-extending scroll flange; and wherein the axially-extending diffuser flange and the axially-extending scroll flange terminate at a same axial position along the engine central longitudinal axis.

7. The gas turbine engine of claim 6, wherein the containment flange extends radially across the axially-extending scroll flange of the compressor scroll and the axially-extending diffuser flange of the diffuser.

8. The gas turbine engine of claim 6, further comprising a plurality of anti-shear pins disposed between circumferentially adjacent scroll flange bolts of the plurality of scroll flange bolts, the plurality of anti-shear pins extending through the containment flange and at least partially into the compressor scroll.

9. The gas turbine engine of claim 6, wherein the plurality of scroll flange bolts have a first bolt diameter larger than a second bolt diameter of the plurality of diffuser flange bolts.

10. The gas turbine engine of claim 6, wherein a second support structure of the one or more support structures is a bearing support structure of the gas turbine engine.

11. A propeller and engine system of an aircraft, comprising:

a propeller assembly including:

a hub; and a plurality of propeller blades operably connected to the hub; and a gas turbine engine operably connected to the propeller assembly and configured to drive the propeller assembly, the gas turbine engine including a compressor assembly including:

an impeller configured to rotate about an engine central longitudinal axis;

a diffuser disposed at a compressor outlet fluidly downstream of the impeller, the diffuser including:

a forward diffuser; and a rear diffuser coupled to the forward diffuser by a plurality of diffuser bolts extending through the rear diffuser and into the forward diffuser; and one or more support structures secured to the diffuser via a plurality of support fasteners;

wherein the plurality of support fasteners are configured to be frangible when torsional loads from the diffuser on the one or more support structures exceed a predetermined limit, thereby isolating the impeller and the diffuser from the one or more support structures;

wherein a first support structure of the one or more support structures is a compressor scroll disposed radially outboard of the diffuser; and further comprising a containment flange secured to the compressor scroll via a plurality of scroll flange bolts and secured to the rear diffuser via a plurality of diffuser flange bolts, wherein the plurality of diffuser flange bolts are support fasteners;

wherein the rear diffuser includes an axially-extending diffuser flange that radially abuts an axially-extending scroll flange of the compressor scroll;

wherein the plurality of diffuser flange bolts extend through the containment flange and at least partially into the axially-extending diffuser flange;

wherein the plurality of scroll flange bolts extend through the containment flange and at least partially into the axially-extending scroll flange; and wherein the axially-extending diffuser flange and the axially-extending scroll flange terminate at a same axial position along the engine central longitudinal axis.

12. The propeller and engine system of claim 11, wherein the containment flange extends radially across the axially-extending scroll flange of the compressor scroll and the axially-extending diffuser flange of the diffuser.

13. The propeller and engine system of claim 11, further comprising a plurality of anti-shear pins disposed between circumferentially adjacent scroll flange bolts of the plurality of scroll flange bolts, the plurality of anti-shear pins extending through the containment flange and at least partially into the compressor scroll.

14. The propeller and engine system of claim 11, wherein a second support structure of the one or more support structures is a bearing support structure of the gas turbine engine.

* * * * *